Oct. 22, 1968  H. P. LANDI  3,407,249
POROUS, EXTENSIVELY FIBRILLATED POLYTETRAFLUOROETHYLENE
AND METHOD OF PREPARING SAME
Filed Feb. 28, 1966
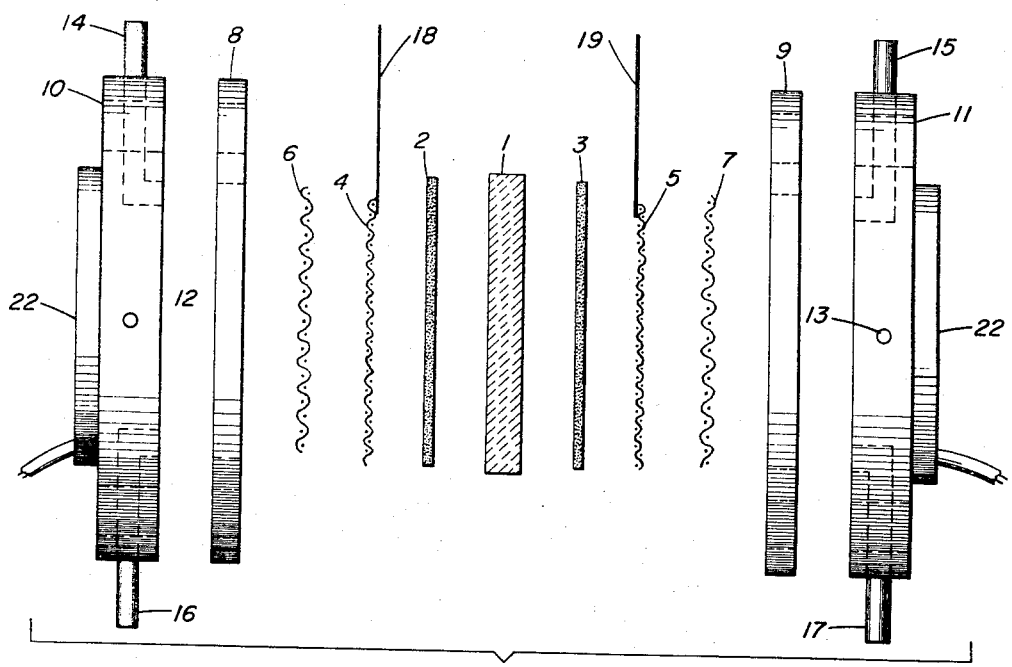
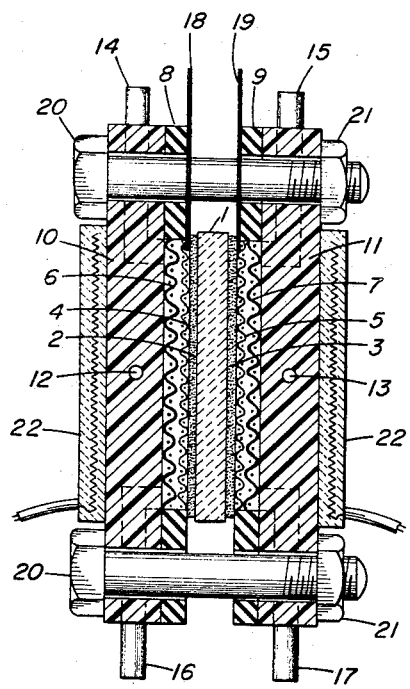
INVENTOR.
HENRY PATRICK LANDI
BY
ATTORNEY United States Patent Office 3,407,249
Patented Oct. 22, 1968

3,407,249
POROUS, EXTENSIVELY FIBRILLATED POLY-
TETRAFLUOROETHYLENE AND METHOD
OF PREPARING SAME
Henry Patrick Landi, Yorktown Heights, N.Y., assignor
to American Cyanamid Company, Stamford, Conn., a
corporation of Maine
Continuation-in-part of application Ser. No. 467,987,
June 29, 1965. This application Feb. 28, 1966, Ser.
No. 530,346
5 Claims. (Cl. 264—49)

This applicaton is a continuation-in-part of a copending application for Letters Patent, Ser. No. 467,987, filed June 29, 1965, and now abandoned.

The present invention relates to unsintered, porous, completely fibrillated polytetrafluoroethylene sheets and to methods for their preparation. More particularly, the invention relates to a modification of normally hydrophobic sheets of polytetrafluoroethylene and to prepare therefrom wettable, unsintered, porous and completely fibrillated structures eminently suitable for a variety of diverse uses, for instance, as matrices for fuel cells, as gas permeable-electrolyte liquid impermeable backings for fuel cell electrodes, as battery separators, as membranes for desalinization or as ordinary filtering aids.

It is well known that porous polytetrafluoroethylene sheets are highly hydrophobic. As such, they cannot normally be employed in applications which require the wetting of their surfaces. If sheets of hydrophobic polytetrafluoroethylene can be sufficiently modified so as to permit both the suitable wetting of their surfaces and their internal volume, sundry uses presently unavailable and unfeasable for these sheets could be readily realized and would serve to fulfill a long-felt need.

Unexpectedly, it has been found that a porous, normally hydrophobic polyeterafluoroethylene sheet can be readily modified in a straightforward and relatively economical manner. In accordance with the process of the invention, an aqueous dispersion of polytetrafluoroethylene or "Teflon" particles which the approximately 0.1 micron to 0.5 micron in diameter with wrinkled surfaces resembling distorted, collapsed, deflated and hollow spheres as viewed under an electron microscope, is admixed with a solvent-extractable, highly viscous resinous polymer, such as, for instance, molten polymethylmethacrylate, polyethylene oxide or an alkali metal shellacate, rosinate or tallate or any equivalent thereof, and, optionally, if desired, with sufficient solvent-insoluble non-electron conducting inorganic or organic filler which can constitute as much as 98% by weight of the finished sheet. Shearing of the "Teflon" particles occurs when the latter components of the over-all composition are conventionally hot-milled and extruded. The milling and extruding operations are critical, for otherwise the spherical polytetrafluoroethylene latex particles are not transformed into a network of lengthy, randomly-oriented fibers. Subsequent to extrusion, a sheet-like structure is formed. The latter is then soaked in a suitable selective organic solvent to dissolve and thereby remove from the sheet all of the solvent-extractable viscous, resinous polymeric additive. So-treated sheet is washed with water and dried.

In an alternative embodiment, a highly porous, unsintered, extensively fibrillated polytetrafluoroethylene sheet devoid of inorganic or organic filler is formed in accordance with the practice of the invention. This sheet is next treated with a solution containing a non-electron conducting filler as by dipping the formed sheet into the latter solution to effect impregnation of that sheet with filler.

In general, any commercially-available aqueous dispersion of polytetrafluoroethylene in varying amounts may be treated in the process of the invention. For instance, one such aqueous dispersion employed contains from 59% to 61% solids or particles of polytetrafluoroethylene and from 5.5% to 6.5% of a commercially available non-ionic wetting agent, namely, either an octylphenol polyoxyethylene or a nonylphenol polyoxyethylene, based on the weight of the particles characterized as ranging from about 0.1 micron to 0.5 micron in diameter. The dispersion in an amount ranging from about 1% to about 40%, by weight based on polytetrafluoroethylene solids contained in said dispersion, is then admixed with, as by blending, a solvent-extractable, highly viscous resinous polymer, hereinabove exemplified, in amounts ranging from about 98% to about 40%, based on the overall solids mixture. Where a filled structure is desired, there may be incorporated into the blended mixture a solvent-insoluble, inorganic or organic non-electron conducting filler in amounts ranging from about 10% to about 50%, based on the overall solids content. However, if desired, the filler may be added even after the sheet has been formed as by vacuum impregnation.

The above mixture is intimately blended and milled at temperatures ranging from about 170° C. to about 200° C. and extruded as by injection molding or calendering. A sheet-like structure is formed. The latter is next treated with any organic solvent in which the above extractable resin component is soluble. Illustrative solvents include: acetone, methyl ethyl ketone and their equivalents. Matted sheets are desirably prepared preferably by rolling the solvent-extracted sheets.

So-prepared sheets when immersed in an alcohol bath can be readily wetted by electrolytes normally employed in fuel cell matrices. To effect exceptional wetting, the polytetrafluoroethylene sheet can be preferably contacted with small amounts, usually from 0.01% to about 2%, of a suitable water-soluble salt of fluorinated aliphatic surfactants, such as ammonium- or sodium perfluorocaprylate.

As hereinabove stated, it is an advantage of the invention that substantially non-electron conducting inorganic or organic fillers of the inorganic and organic types, can be readily incorporated within the network of unsintered polytetrafluoroethylene fibers to levels as high as 98%, by weight, of the over-all final structure. Such non-electron conductive fillers which are defined herein as those which do not possess metallic conductivity are, for instance, metallic oxides, such as tantalum oxide and ceric oxide; water-insoluble salts, such as barium sulfate, calcium sulfate, calcium phosphate, zirconium phosphate and zinc phosphate; ion-exchange resins, such as tin acid phosphate and sulfonated polystyrenes; inert thermoplastic polymers, such as alkali-etched polytetrafluoroethylene floc, polymonochlorotrifluoroethylene, polyformaldehyde and polypropylene oxide.

Advantageously, it is within the purview of the instant invention to utilize a formed sheet as the matrix component of a unitary, laminated composite by compressing, for instance, the formed sheet of the invention positioned between carbon-filled, platinized electrodes.

In order to further clarify the invention, these and other embodiments thereof are shown in the accompanying drawing and will be described in detail in conjunction with said drawing, in which:

FIGURE 1 is an exploded plan view, partially in section, of a fuel cell employing the matrix of the present invention, and FIGURE 2 is a partially expanded side view, partially in section, of the fuel cell of FIGURE 1.

In FIGURE 1, a porous, unsintered, extensively fibrillated polytetrafluoroethylene matrix 1 as prepared in Example 2 below is positioned between a fuel electrode 2, such as platinum, and an oxygen electrode 3, such as platinum, palladium or silver. Abutting the latter electrodes are current collector screens 4 and 5 which comprise nickel or other suitable inert metal. Nickel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as polytetrafluoroethylene or silicone rubber. These gaskets seal as well as separate the chambers containing reactants. Exterior to the gaskets are housing members 10 and 11 to which are attached thermocouple 12 and heat control probe 13 and having inlet stainless steel or other inert metal tubing 14 and 15 through which hydrogen and oxygen as the illustrative fuel and oxidant, respectively, are separately introduced into the fuel cell. Nickel tubing 16 and 17 are provided as vents for unused gases. Wire leads 18 and 19, connected to current collector screens 4 and 5, are the conductive members through which current flows from and to the fuel cell through the external circuit when the fuel cell is in operation. The cell, secured by means of bolts 20 and nuts 21 as shown in FIGURE 2, can be heated, if desired, by, for instance, an external electrical heating pad 22. The temperature of the cell, determined by the thermocouple 12, is controlled by heat control probe 13.

A matrix and its performance in fuel cells can be conveniently prepared in the following illustrative examples which are not to be taken as limitative of the invention. Unless otherwise stated, the parts given are by weight.

Example 1

A blend of (a) 20%, by weight, of polytetrafluoroethylene in the form of an aqueous dispersion containing 59%–61% polytetrafluoroethylene solids and 5.5%–6.5%, by weight based on weight of said solids, of an octylphenolpolyoxyethylene and (b) 80% of polymethylmethacrylate, by weight based on the overall solids, is milled on preheated rolls at 170° C.–175° C. During the milling operation, the polytetrafluoroethylene particles form lengthy interwoven, interconnected fibrils or fibers. A ⅛″ x 2″ x 4″ plaque is next formed by injection molding the above blend and compressing the same between caul plates for from 5 to 10 minutes at 160° C.–170° C. and 3000 p.s.i.g. This plaque is cooled to room temperature and released from the mold.

The formed sheet measures approximately eight inches in diameter and from ten to twenty mils in thickness. The sheet is soaked several times in acetone to dissolve the polymethylmethacrylate present in the sheet. It is then rinsed with alcohol, washed several times with deionized water and, finally, dried by rolling between blotter paper.

Example 2

Performance of a fuel cell is illustrated in this example.

A hydrogen-oxygen fuel cell as hereinabove described is operated at 150° C. with 85% phosphoric acid electrolyte immobilized in the matrix of highly porous, unsintered, completely fibrillated polytetrafluoroethylene sheet as prepared in Example 1 above.

The hydrogen and oxygen electrodes herein employed comprise a 50 mesh tantalum screen to which is applied a mixture of 9 mgs. of platinum black per square centimeter of screen surface in polytetrafluoroethylene waterproofing binder. The area of each electrode exposed to the electrolyte is five square centimeters.

Extensively fibrillated, porous, unsintered polytetrafluoroethylene matrix is initially treated for utilization in a fuel cell by soaking the latter for several hours in 85% phosphoric acid containing 0.1% ammonium perfluorocaprylate at 100° C.–110° C. and allowing the matrix to cool while still immersed in the electrolyte.

The wet matrix is then incorporated into the hereinabove illustrated hydrogen-oxygen fuel cell and the observed current-voltage relationship is tabulated in Table I below as follows:

TABLE 1

| Current (ma./cm.$^2$): | Operating voltage (volt) |
|---|---|
| 0 | 0.989 |
| 40 | 0.734 |
| 100 | 0.545 |
| 200 | 0.144 |

The internal resistance of the cell measures 0.44 ohm at 150° C.

Example 3

The hereinabove-described hydrogen-oxygen fuel cell is operated at 70° C. utilizing 6 N aqueous potassium hydroxide electrolyte immobilized in the matrix as prepared in Example 1, above.

Each of the electrodes which sandwich the matrix contains 9 mg./cm.$^2$ platinum black mixed with polytetrafluoroethylene binder on a 100 mesh nickel screen.

The completely fibrillated, porous, unsintered polytetrafluoroethylene matrix as prepared in Example 1 is further treated by soaking the matrix in ethanol and then displacing the alcohol with 6 N aqueous potassium hydroxide by soaking for about one hour. The wet matrix is then incorporated into the hydrogen-oxygen fuel cell as hereinabove described and operated continuously for three days at 100 ma./cm.$^2$. At the end of this period, the operating cell voltage is 0.855 volt at 100 milliamperes per square centimeter (ma./cm.$^2$) and an internal resistance of 0.03 ohm.

Example 4

Polymethylmethacrylate (95 parts) is heated and milled to a molten viscous state on a rubber mill maintained at a temperature between 170° C. and 190° C. To the rubber mill are next added 5 parts of polytetrafluoroethylene in the form of a 60% aqueous emulsion and 95 parts of ceric oxide are blended into the molten polymethylmethacrylate. On cooling the blend, resultant solid is ground into pellets and injection molded into a ⅛ inch x 2 inch x 4 inch plaque. The plaque is next compression molded at temperatures between 180° C. and 200° C. at a pressure of about 1000 p.s.i. into a sheet 30 mils thick and 6 inches square. This sheet is then immersed in acetone for sixteen hours at 25° C. so as to extract polymethylmethacrylate therefrom. Thereafter, the sheet is washed with acetone for from one to two hours in subsequent washings.

Resultant sheet is then washed with ethyl alcohol and water. After all the polymethylmethacrylate is removed, the sheet is composed substantially of 95% of ceric oxide and 5% of completely fibrillated polytetrafluoroethylene. The sheet is then completely saturated with water which displaces the ethyl alcohol. The sheet is next immersed in a 30% aqueous potassium hydroxide electrolyte solution until completely saturated.

Good performance of an hydrogen-oxygen fuel cell is noted when the above prepared matrix is utilized at temperatures even as high as 200° C.

Example 5

Following the procedure of Example 4 above in every detail, except that the sheet will contain 95%, by weight, of tin acid phosphate in lieu of 95% ceric oxide. The so-formed sheet is saturated with water in the same manner and, subsequently, is vacuum impregnated with 100% phosphoric acid until saturated.

Resultant impregnated sheet is then cut three inches square and placed between 2 inch square electrodes defined in Example 3. The compressed laminate is inserted in a hydrogen/oxygen fuel cell which is operated at 175° C. with good attendant performance. Current density and operating voltage data are recorded in Table II below.

TABLE I

| Operating voltage (in volts): | Current density, ma./cm.$^2$ |
|---|---|
| 0.970 | Open circuit |
| 0.927 | 10 |
| 0.863 | 40 |
| 0.756 | 100 |
| 0.596 | 200 |

The internal resistance of the cell measures 0.014 ohm at 175° C.

Substituting for the tin acid phosphate in the above example a sodium-etched polytetrafluoroethylene floc, there is prepared a matrix possessing similarly enhanced performance characteristics.

Example 6

A sheet containing 80% by weight of barium sulfate and 20% by weight of unsintered, completely fibrillated polytetrafluoroethylene is prepared as described above in Example 4. The porous, non-electron conducting filled sheet is then washed successively with alcohol, and then with water and, finally, is saturated with 100% phosphoric acid. Resultant sheet is cut to size and placed between two standard platinized carbon water-proofed electrodes and tested as a hydrogen-air fuel cell at 175° C. with good performance. The data is summarized in Table III below.

TABLE III

| Operating voltage: | Current density, ma./cm.$^2$ |
|---|---|
| 0.966 | Open circuit |
| 0.885 | 10 |
| 0.745 | 40 |
| 0.533 | 100 |

The internal resistance of the cell measures 0.059 ohm at 175° C.

Example 7

This example illustrates the effect on porosity and tensile strength of sheets prepared by the procedure of Example 4 incorporating into unsintered, porous, extensively fibrillated polytetrafluoroethylene material a variety of non-electron conducting fillers in varying proportions which are summarized in Table IV below as Sheets A through D. There is also included as Sheet E, the unfilled, porous, unsintered, extensively fibrillated sheet prepared in accordance with Example 1, and as Sheet F, commercially-available sintered polytetrafluoroethylene sheet.

In Table IV below, there are summarized compositions with and without filler prepared in accordance with the procedure set forth in Example 4 above.

TABLE IV

| Sheet | Percent Filler (by weight) | Percent (by weight) of the completely fibrillated, unsintered polytetrafluoroethylene, percent |
|---|---|---|
| A | Polymonochlorotrifluoroethylene, 26 | 74 |
| B | Polymonochlorotrifluoroethylene, 90 | 10 |
| C | Ceric Oxide, 95 | 5 |
| D | Barium Sulfate, 80 | 20 |
| E | 0 | 100 |
| F | 0 | 100 |

Porosity and tensile strength data for each of the typical filled and unfilled Sheets A through F above are summarized in Table V below.

TABLE V

| Sheet | Total Porosity (Vol. %) | Porosity — Volume percent of pores within the range of— | | | Tensile Modulus of Elasticity, p.s.i. | Percent Elongation to break |
|---|---|---|---|---|---|---|
| | | <0.035μ | 0.1–1.0μ | 1.0–10.0μ | | |
| A | 43.0 | 3.66 | 39.0 | 20.1 | 35,000 | 12.5 |
| B | 37.5 | 6.25 | 67.0 | 15.0 | 28,000 | 57.4 |
| C | 61.0 | 18.1 | 48.0 | 16.4 | 14,000 | 20.0 |
| D | 46.5 | 12.1 | 67.0 | 6.0 | 17,000 | 11.6 |
| E | 46.34 |  | 32.3 | 34.8 | [1] 33,000 | [2] 15.9 |
| F | 47.4 | 9.5 | 12 | 65 | 4,000 | 8.1 |

[1] Yielded before breaking.
[2] At yield.

It can be readily seen from the above table that the highly porous, completely fibrillated, unsintered polytetrafluoroethylene of the invention functions as an inert binder or support for large quantities of a variety of non-electron conducting fillers. Advantageously, enhanced structures which exhibit unexpected good tensile strength properties are thereby obtained.

I claim:

1. A method for preparing a porous, unsintered, completely fibrillated polytetrafluoroethylene sheet which comprises: intimately blending from about 1% to about 40%, by weight, of polytetrafluoroethylene in the form of an aqueous dispersion and from about 98% to 40%, by weight, of an organic-solvent extractable viscous polymer, based on the weight of the overall mixture; milling the latter mixture at temperatures ranging from about 170° C. to about 200° C.; extruding the milled product to form a sheet; immersing said formed sheet in an organic solvent selective for the solvent extractable viscous polymer thereby dissolving the latter polymer from said formed sheet; and recovering the latter as a porous, unsintered, completely fibrillated polytetrafluoroethylene sheet.

2. A process according to claim 1, in which the organic-solvent extractable polymer is polymethylmethacrylate.

3. A process according to claim 1, in which the organic solvent is acetone.

4. A process according to claim 1, in which there is incorporated into the mixture to be blended from about 10% to about 50% of a nonelectron conducting filler insoluble in said organic solvent selective for the extractable viscous polymer.

5. A process according to claim 1, in which the formed sheet is further washed with alcohol and subjected to the action of an electrolyte.

References Cited

UNITED STATES PATENTS

| | | | |
|---|---|---|---|
| 3,202,733 | 8/1965 | Strauss | 264—49 |
| 3,242,246 | 3/1966 | Stand | 264—49 XR |
| 3,281,511 | 10/1966 | Goldsmith | 264—49 |
| 3,315,020 | 4/1967 | Gore | 264—127 XR |
| 3,323,978 | 6/1967 | Rasmussen | 161—169 |

JULIUS FROME, *Primary Examiner.*

PHILIP E. ANDERSON, *Assistant Examiner.*